May 26, 1931. J. B. McCULLOUGH ET AL 1,807,222
FLUID SAVING DEVICE
Filed Sept. 4, 1929  2 Sheets-Sheet 1
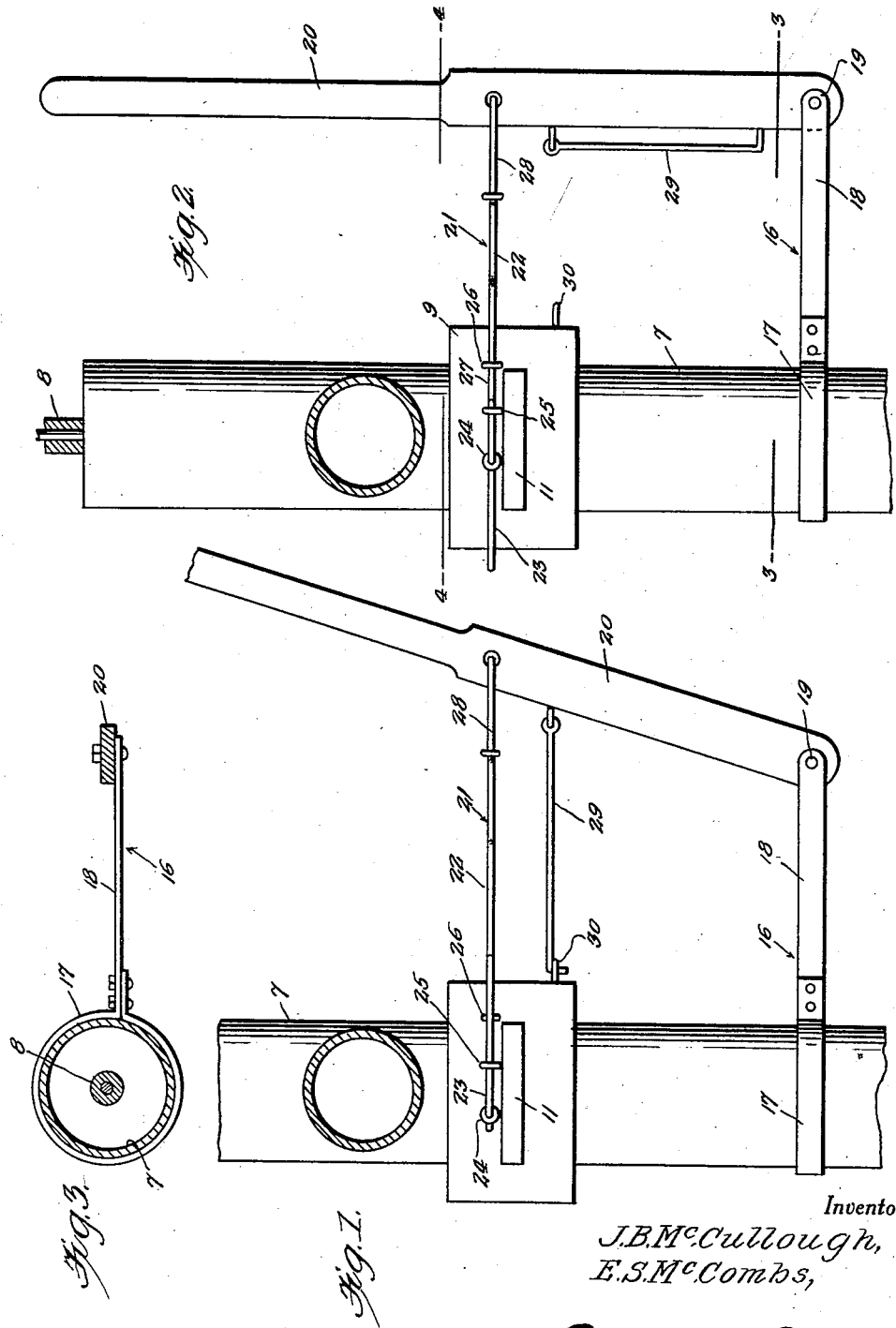
Inventor
J.B.McCullough,
E.S.McCombs,
By Clarence A.O'Brien
Attorney

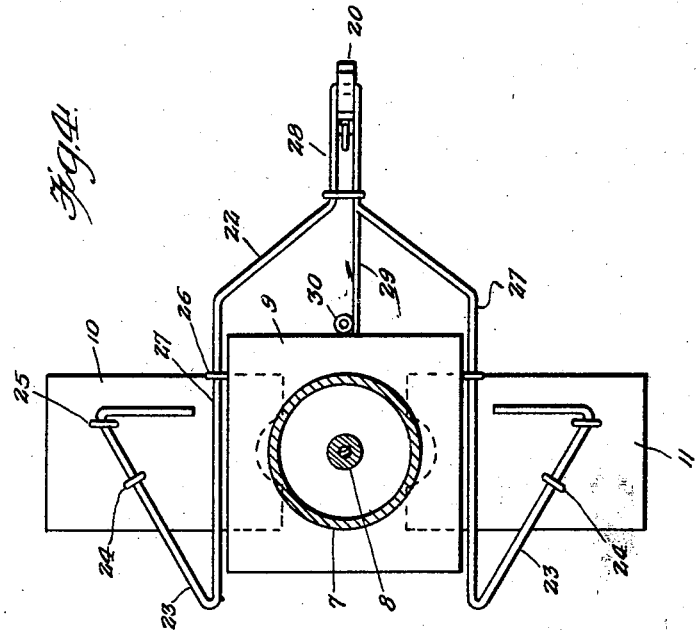
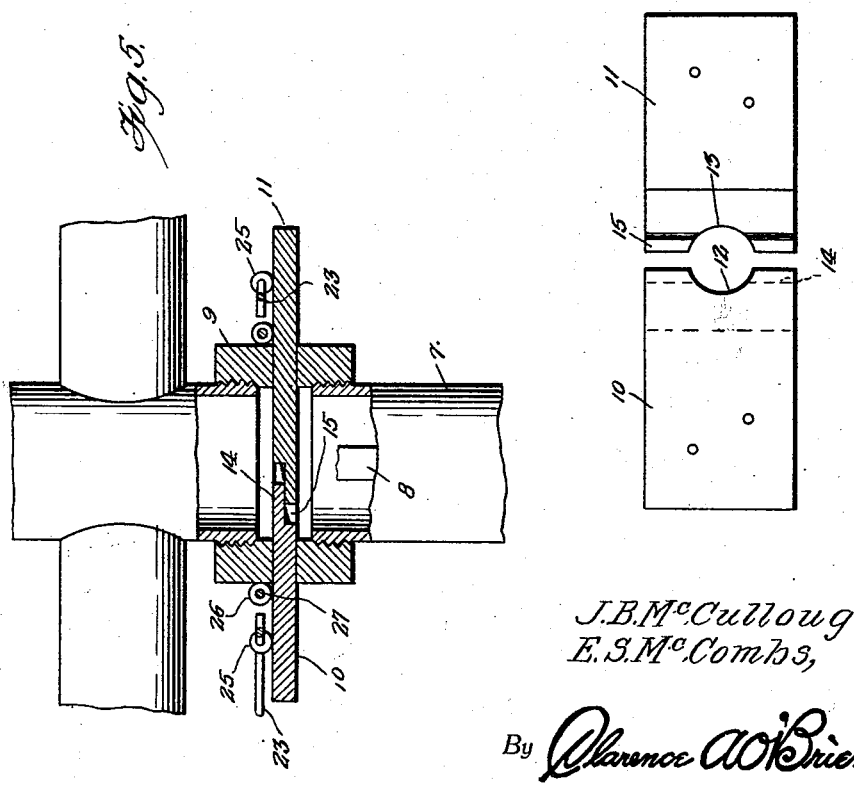

Patented May 26, 1931                                                    1,807,222

UNITED STATES PATENT OFFICE

JOSEPH B. McCULLOUGH AND EDWARD S. McCOMBS, OF BAXTER SPRINGS, KANSAS

FLUID SAVING DEVICE

Application filed September 4, 1929. Serial No. 390,349.

This invention relates to an improved gate valve which is especially designed for use in association with oil wells for saving oil.

More specifically stated, the invention has reference to a valve structure so made as to permit the tubular passage way within the well casing, within which there is a rod, for instance the pump rod, to be closed to the passage of fluid (oil) without removing the rod.

Our principal aim is to generally improve upon valve mechanisms or structures of this class by providing one which is characterized by unusual simplicity, wherein the sections constituting the gate valve per se are easily operable and made to come together in a fluid tight manner around the rod, and wherein the novel manually manipulated cam actuating means is provided for controlling the valve.

In carrying out the invention we have evolved and produced a novel contribution to the art, which it is believed, will supersede similar patented and marketed valve structures and which it is thought will better fulfill the requirements of an invention of this class in a more satisfactory and dependable manner.

Other features and advantages will become more readily apparent from the following description and drawings.

In the drawings:

Figure 1 is a fragmentary side elevational view showing a portion of a well casing embodying the improved gate valve, its housing, and operating means constructed in accordance with the present invention, the valve being shown closed.

Figure 2 is a view like Figure 1 with the valve open.

Figure 3 is a horizontal sectional view taken approximately upon the plane of the line 3—3 of Figure 2.

Figure 4 is a horizontal sectional view taken on the plane of the line 4—4 of Figure 2.

Figure 5 is a fragmentary detail sectional and elevational view showing the manner in which the sections of the gate valves come together within the well casing.

Figure 6 is a top plan view of the sections themselves showing the configuration thereof.

Referring now to the drawings by reference numerals it will be seen that the reference character 7 designates generally the well casing which may be of any ordinary design. Mounted for reciprocation within this is a customary sucker rod 8. Embodied in the casing is a coupling 9 which is designed to provide a mounting and housing for the gate valve structure. This valve as before indicated comprises substantially duplicate complemental sections 10 and 11 as seen in Figure 6. The adjacent inner ends of these are provided with semi-circular notches 12 and 13, which when brought together form a circular opening which embraces the piston or pump rod. Moreover the adjacent ends are beveled as at 14 and 15 to come into fluid tight overlapping relation as seen in Figure 5, thereby bridging the passage way, and closing it against passage of fluid, and at the same time obviating the necessity of removing the pump rod.

The means for moving the valve plates or sections inwardly and outwardly with respect to each other comprises manually manipulated details having a relative association as seen in Figures 1, 2 and 4. As shown in Figures 1 and 2, the reference character 16 designates a supporting bracket which includes an annulus 17 embracing the well casing and an outstanding supporting arm 18. Pivoted to this at 19 is an operating lever 20. An operating connection generally indicated at 21 is disposed between the intermediate portion of the lever and the respective valve sections. This is generally in the form of a wire frame of a special configuration. It includes a frame like portion 22 whose arms have their free ends formed to provide substantially triangular cams. The portions 23 of these cams slide through and cooperate with eyes 24 and 25 on the respective valve plates. There is also a relatively stationary eye 26 through which the portion 27 of the cam is slidable. The bight portion of the frame is formed with a reduced extension at 28 functioning as a yoke and pivotally connected at the intermediate portion of the lever. Hence it will be seen that through the medium of the cooperating eye and cam elements on the sliding frame or operating connection 21, the lever may be rocked back and forth to open and close the valve sections.

It is desirable to provide retaining hooks 29 carried by the lever and cooperable with a keeper eye 30 on the valve casing.

From the foregoing description and drawings it will be seen that when the operating lever 20 is pulled outwardly or away from the valve housing, the cam coacting means will actuate the valve plates toward each other and close the fluid passageway in the valve casing, pushing the lever inwardly will open the valve again. Thus it is possible to trap the oil to effect a saving and to prevent burning in case of fire.

It is further thought that by considering the description in conjunction with the drawings, a clear understanding of the construction, assembly, and operation of features of the invention will be quite clear to persons skilled in the art to which the invention relates. Therefore, a more lengthy description is regarded unnecessary.

Minor changes in shape, size, and rearrangement of details coming within the field of invention claimed may be resorted to in actual practice if desired.

Having thus described the invention, what we claim as new and desire to secure by Letters Patent is:—

In a structure of the class described, a valve housing, a pair of oppositely disposed valve plates slidable in the guides formed in said housing, a plurality of complemental eyes mounted on the valve plates and housing, a pivotally mounted operating lever, a yoke like operating connection between the lever and valve plates, the arms of said operating connection being formed into substantially triangular actuating cams cooperable with said eyes in a manner to move said valve plates toward and from each other to close and open the valve.

In testimony whereof we affix our signatures.

J. B. McCULLOUGH.
E. S. McCOMBS.